United States Patent Office 3,284,750
Patented Nov. 8, 1966

3,284,750
LOW-TEMPERATURE, NEGATIVE-RESISTANCE ELEMENT
Kiichi Komatsubara, Kodaira-shi, Japan, assignor to Kabushiki Kaisha Hitachi Seisakusho, Tokyo-to, Japan, a joint-stock company of Japan
Filed Mar. 25, 1964, Ser. No. 354,528
Claims priority, application Japan, Apr. 3, 1963, 38/16,377
3 Claims. (Cl. 338—22)

This invention relates to extremely low-temperature semiconductor devices and particularly to improvements in highly compensated semiconductors, that is, so-called CRYOSARS. The CRYOSAR was initially devised by A. L. McWorther and R. H. Rediker and so named by them (I.R.E. 47, 1959, 1207).

More specifically, and briefly stated, the invention resides in a technique whereby, by imparting to CRYOSARS of known type a mechanical force such as compressive stress or tensile stress from the outside, the characteristics of the CRYOSARS can be selectively varied at will, and the CRYOSARS are caused to have desired characteristics.

The nature, principle, and details of the invention, as well as the specific objects of the invention, will be best understood by reference to the following description, taken in conjunction with the accompanying drawings in which like parts are designated by like reference characters, and in which.

In order to indicate fully the nature and utility of the present invention the following fundamental consideration of semiconductor devices having characteristic features such as high-speed switching and low power consumption, that is, CRYOSARS, which have appeared in recent years, is presented.

In the case when a semiconductor such as germanium or silicon or a group III–V intermetallic compound is placed in a low-temperature state, almost all of the electrons or holes contributing to the electrical conductance thereof at room temperature return to the state of impurity atoms, and consequently, the electrical resistance reaches a value as high as 10,000 times that at room temperature. However, this phenomenon is evident under the condition of measurement of the semi-conductor subjected to a weak electric field. On one hand, since the phenomenon is observed at an extremely low temperature (77° K. and below), the effect of lattice scattering of the semiconductor becomes small, and the mobility of the electrons and holes becomes large. Accordingly, even when a relatively weak electric field is applied to this semiconductor element, the electrons and holes are readily accelerated and undergo impact ionization with the impurity atoms introduced as doping into the semiconductor, whereby new conduction electrons or holes are formed. When this process successively occurs, and a voltage above a certain value is applied, an avalanche breakdown by impact ionization occurs, and the electrical resistance decreases abruptly and becomes almost zero.

Figure 1:
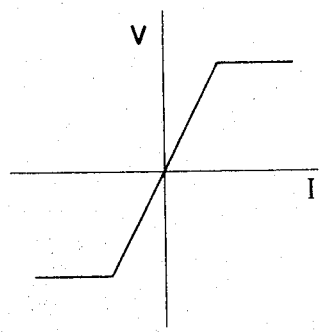
FIGURES 1 and 2 are graphical representations showing voltage-current characteristic curves of semiconductor elements at low temperature, FIGURE 1 showing a curve of a semiconductor containing a single kind of acceptor or donor type impurity, and FIGURE 2 showing a curve of a highly compensated semiconductor containing both acceptor type and donor type impurities.
Figure 2:
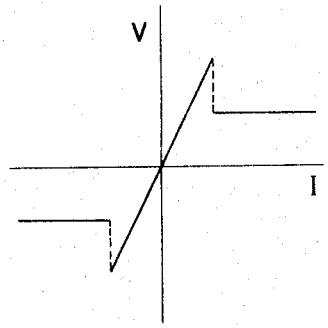

FIGS. 1 and 2 indicates the above described characteristic, FIGURE 1 indicating the voltage-current characteristic of a semiconductor element containing majority impurity atoms of only one kind, either donor or acceptor, and FIGURE 2 indicating that of a semiconductor element containing both impurities, that is, containing minority impurity atoms for the purpose of compensation. This is generally referred to as compensation of the majority impurity in a reverse conductivity type with minority impurities, and a semiconductor thus compensated is called a compensated semiconductor. Particularly, when the concentration of the minority impurity is very close to that of the majority impurity and the specific resistance of a semiconductor is apparently high, it is called a highly compensated semiconductor. These semiconductors, at low temperature, exhibit relatively high resistivity values in the low-voltage region.

Elements possessing the nonlinear characteristic of a semiconductor wherein such low temperature is utilized have heretofore been called CRYOSARS. Especially in the case of an element possessing the characteristic indicated in FIGURE 2, two stable points can be obtained in addition to the negative resistance which it possesses. Therefore, such an element can be caused to accomplish operations such as switching, memory storage, and pulse amplification. CRYOSARS, which possess these highly desirable, negative resistance characteristics, are being widely studied.

As a result of research, including various experiments on known CRYOSARS, the present inventors previously have proposed special methods of utilizing CRYOSARS. Specifically, in Japanese patent application, No. 11,820/1962, it has been made clear that, in the case when a CRYOSAR is subjected to light irradiation, although the critical voltage $E_c$ (the maximum voltage prior to the occurrence of negative resistance) generally decreases progressively with increase in the intensity of irradiation, if, in addition to the already present impurity (acceptor-type or donor-type impurities), a suitable quantity of one metal or a plurality of metals such as nickel, gold, iron, and thallium is added to the CRYOSAR in order to create a deep trap level within the basic semiconductor material, the critical voltage $E_c$, which had been thought to decrease with irradiation, will increase to a peak at a certain point. Furthermore, in Japanese patent application, No. 42,816/1962, it has been disclosed that, by applying a magnetic field to a known CRYOSAR, the critical voltage $E_c$ (critical field) and the sustaining voltage $E_s$ (sustaining field) are increased, and as the magnetic field strength is further increased, a coherent oscillation phenomenon begins to appear, the oscillation frequency thereof increasing with increasing strength of the magnetic field.

The present invention, which is based on and derived from a continuation of the above mentioned series of research and experiments, has as a general object the providing of a technique for causing known CRYOSARS to possess quantitatively desired negative resistance characteristics.

More specifically, it has been found that, when a mechanical compressive force or a tensile force is applied to a highly compensated semiconductor element such as, for example, a semiconductor element having, as a whole element, a high resistivity in the extremely low-temperature region (a CRYOSAR) and containing, for example, in a germanium element, from $10^{15}$ to $10^{16}$ atoms/cc. of indium as a p-type impurity and from 50 to 90 percent (in terms of the quantity of indium) of antimony, the said force being applied in a direction parallel or perpendicular to the flow of current through the element, the negative resistance characteristic of the CRYOSAR varies. That is, the critical field $E_c$ and the sustaining field $E_s$ vary, both $E_c$ and $E_s$ decreasing with increase in compressive force.

The foregoing is only one example of the invention, and usable semiconductor materials also include silicon, InSb, GaP, InAs, AlSb and others. Also, impurities which can be added to these semiconductor materials are In, B, Ga, Al and others as p-type impurities for germanium and silicon, and P, Sb, As and others as n-type impurities; for intermetallic compounds of the IV-V groups, generally Mg, Zn and Cd are suitable as p-type, and Li, Se and Te as n-type, impurities. The concentration of impurities to be added to the semiconductor materials range from $10^{14}$ atoms/cc. to $10^{16}$ atoms/cc. for the majority impurity and from 50 to 90 percent for the minority impurity.

The basic mechanism of this phenomenon may be considered to reside in various factors such as variation due to compressive stress in the valence band and spreading of the wave function of impurity electrons. Relating to this phenomenon, there is a report by Konig, Price, and others, who have reported that, when a compressive force is applied to p-type germanium in a low-temperature state (not highly compensated), the low-temperature breakdown characteristic varies and a report by Fritsche and others relating to the resistance variation of a semiconductor at extremely low temperature.

The exact reasons for the variation of the negative resistance characteristics of highly compensated semiconductors and intermetallic compounds due to external compressive force or external tensile force are not clearly known. However, it is believed that application of compressive force to a highly compensated semiconductor in the extremely low-temperature state causes a change in the band structure, which is one of the significant factors contributing to the creation of the negative resistance characteristic, and the two-fold generated at the Brillouin zone center splits off into two bands separated by strain energy, with the result that there occur changes such as changes in the impurity level density and activation energy, a change in the mutual action of two bands of the free carrier, or a change in the effective mass of the free carrier, whereby the negative resistance characteristic is caused to vary.

Figure 3:
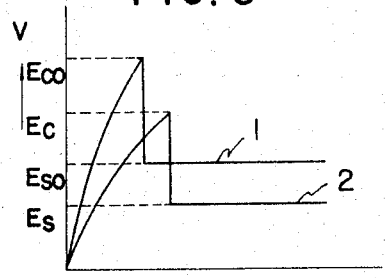
FIGURE 3 is a graphical representation showing voltage-current characteristic curves of an extremely low-temperature, negative-resistance element according to the invention under different mechanical conditions.

The general variation of negative resistance of a CRYOSAR subjected to compressive force is indicated in FIGURE 3, wherein curve 1 represents the negative resistance characteristic of the CRYOSAR in the case when a compressive force is not applied thereon, and curve 2 represents that in the case when a compressive force is applied thereon. As is apparent from this graph, the critical field and sustaining field of the negative resistance vary, which fact means that, by applying compressive force, on-off control is possible. In view of the variation of the effective mass and the decrease in the value of the impurity level, it is possible to obtain an element having a switching speed which is higher than that of a conventional CRYOSAR by continuously applying compressive force on a CRYOSAR and causing it to perform switching.

In order to indicate more fully the nature of the invention, the following detailed description thereof with respect to preferred embodiments of the invention is presented.

Figure 4:
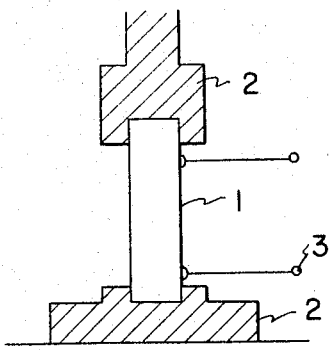
FIGURES 4 and 5 are simplified elevational views, each showing an embodiment of the invention.
Figure 5:
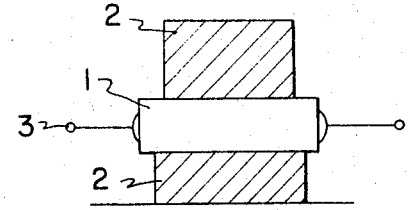

Referring to FIGURES 4 and 5, there are shown simplified views indicating apparatuses for applying compressive or tensile force on a germanium CRYOSAR 1 placed in the central part of each apparatus. The germanium CRYOSAR 1 has the dimensions of 2 x 2 x 4.2 mm., a majority impurity (indium) content of $10^{15}$ atoms/cc., and a compensation ratio of 0.82 (antimony). Here, the compensation ratio is represented by a ratio of the minority impurity concentration to the majority impurity concentration in a semiconductor. Each apparatus is placed in liquid helium at an absolute temperature of 4.2 degrees K. Compressive or tensile force is applied through quartz holders 2 to the CRYOSAR 1, which is provided with electrodes 3.

Figure 6:
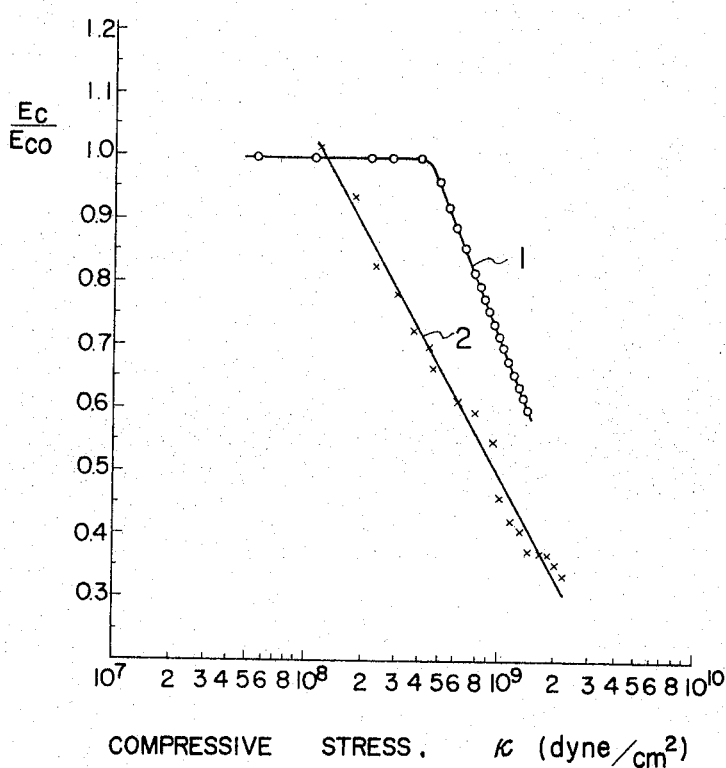
FIGURES 6 and 7 are graphical representations, each showing results of measurements made with respect to embodiments of the invention.
Figure 7:
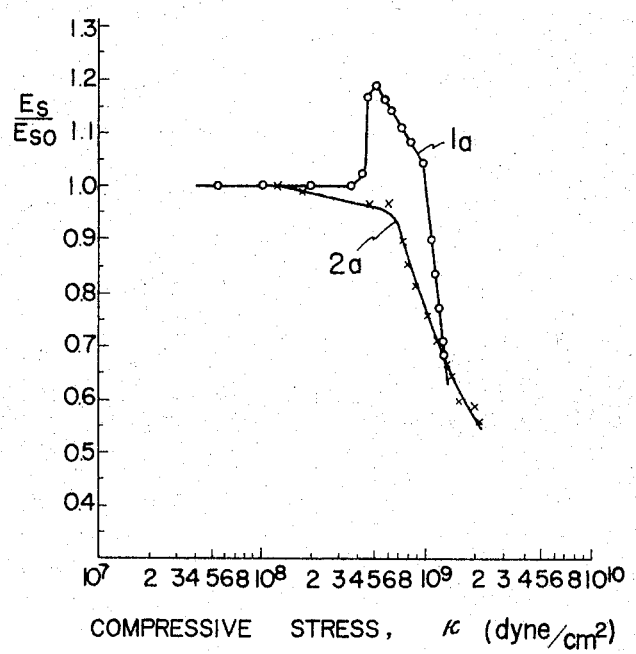

The results of measurements made in connection with apparatus of the above described construction are shown in FIGURES 6 and 7. FIGURE 6 indicates rates of variation of the critical field of the element 1 with respect to the uniaxial compressive stress ($\chi$), and FIGURE 7 indicates rates of variation of the sustaining field of the CRYOSAR with respect to the uniaxial compressive stress. Curves 1 and 1a indicate the said rates of variation in the case when, on a CRYOSAR element exhibiting a critical field $E_{co}$ of 56.0 volts and a sustaining field $E_{so}$ of 23.5 volts for zero compressive force, compressive force is applied in a direction parallel to the current flowing through the element and to the crystal orientation axis <111> thereof. Curves 2 and 2a indicate the said rates of variation in the case when the direction of compressive force applied on a CRYOSAR element exhibiting a critical field of 30.0 volts and a sustaining field of 11.7 volts for zero compressive force and the direction of the current flowing through the element are parallel to the crystal orientation <100> of the element.

It is to be observed from these results that a CRYOSAR exhibits anisotropy dependent upon its crystal orientation, and its negative resistance characteristic does not vary uniformly.

While the foregoing description with respect to illustrative embodiments of the invention relates to germanium CRYOSARS, it is possible to apply the teachings of the invention also to other semiconductor substances having two-fold generated band structures suitable for use as above described such as, for example, silicon and group III-V compound semiconductors. Furthermore, the negative resistance characteristic of a CRYOSAR can be varied also by applying torsional force thereon instead of compressive and tensile forces.

It should be understood, therefore, that the foregoing disclosure relates to only particular embodiments of the invention and that it is intended to cover all changes and modifications of the examples of the invention herein chosen for the purposes of the disclosure, which do not constitute departures from the spirit and scope of the invention as set forth in the appended claims.

What is claimed is:

1. High-speed electromechanical on-off switching device exhibiting negative resistance characteristics comprising a highly compensated semiconductor element having negative resistance characteristics and provided with two electrodes to impart current to said element, said two electrodes being separated from each other on the surface of said element; means to maintain said element in an extremely low temperature state of 77° K. and less; and means for imparting a mechanical force to said element in accordance with the required switching function.

2. The device as defined in claim 1, wherein the direction of the current flowing through said element is perpendicular relative to the stress imparted to said element.

3. The device as defined in claim 1, wherein the direction of the current flowing through said element and the direction of the stress imparted thereto are identical.

References Cited by the Examiner

UNITED STATES PATENTS

| | | | |
|---|---|---|---|
| 3,011,133 | 11/1961 | Koenig et al. | 338—32 |
| 3,137,834 | 6/1964 | Pfann | 338—6 |
| 3,150,341 | 9/1964 | Pfann | 338—2 |

OTHER REFERENCES

Smith: "Piezoresistance Effect in Germanium and Silicon," Physical Review, volume 94, No. 1, April 1, 1954, pp. 42–49.

RICHARD M. WOOD, *Primary Examiner.*

W. D. BROOKS, *Assistant Examiner.*